US011939781B2

(12) United States Patent
Fabbi

(10) Patent No.: US 11,939,781 B2
(45) Date of Patent: Mar. 26, 2024

(54) FALL PROTECTION SYSTEM

(71) Applicant: Unified Safety Inc

(72) Inventor: Christopher Fabbi, Kelowna (CA)

(73) Assignee: Unified Safety Inc., Kelowna (CA)

( * ) Notice: Subject to any disclaimer, the term of this patent is extended or adjusted under 35 U.S.C. 154(b) by 849 days.

(21) Appl. No.: 16/971,069

(22) PCT Filed: Feb. 20, 2019

(86) PCT No.: PCT/CA2019/050210
§ 371 (c)(1),
(2) Date: Aug. 19, 2020

(87) PCT Pub. No.: WO2019/161496
PCT Pub. Date: Aug. 29, 2019

(65) Prior Publication Data

US 2020/0392748 A1 Dec. 17, 2020

Related U.S. Application Data

(60) Provisional application No. 62/632,781, filed on Feb. 20, 2018.

(51) Int. Cl.
*E04G 21/32* (2006.01)
*A62B 35/00* (2006.01)
*F24F 7/02* (2006.01)

(52) U.S. Cl.
CPC ........ *E04G 21/328* (2013.01); *A62B 35/0068* (2013.01); *A62B 35/0087* (2013.01); *E04G 21/3295* (2013.01); *F24F 7/02* (2013.01)

(58) Field of Classification Search
None
See application file for complete search history.

(56) References Cited

U.S. PATENT DOCUMENTS 1,930,734 A * 10/1933 Weinstein ........... E04D 13/1415 52/62
3,426,667 A * 2/1969 Johnson .................. F24F 13/08 454/275
(Continued)

FOREIGN PATENT DOCUMENTS

DE 102008010445 8/2008
EP 0 593 150 4/1994
(Continued)

OTHER PUBLICATIONS

International Searching Authority, International Search Report and Written Opinion dated Apr. 26, 2019 in PCT/CA2019/050210.

*Primary Examiner* — Joshua K Ihezie
(74) *Attorney, Agent, or Firm* — Critical Path IP Law, LLC

(57) ABSTRACT

A module for a fall protection system comprises a structural sheet having a ridge and an attachment panel extending laterally therefrom and one or more attachment sections. The attachment panel can be secured to a structure. The module has one or both of: (i) an anchorage connector attached to the ridge at an attachment section; and (ii) a rail clamp having a sleeve portion and a leg portion attached to the ridge at an attachment section; a rail extending through and supported by the sleeve portion; and a slider supported on the rail. The slider is slideably movable along the rail and has a slider anchorage connector. The ridge may be received in a flashing ridge having a flashing extending laterally therefrom to provide coverage for the attachment panel. A person may be attached to the anchorage connector or the slider anchorage connector via a safety line.

27 Claims, 15 Drawing Sheets

(56) References Cited

U.S. PATENT DOCUMENTS

| | | | | | | |
|---|---|---|---|---|---|---|
| 4,607,724 | A | * | 8/1986 | Hillberg | E04G 21/329 | 182/36 |
| 4,699,245 | A | * | 10/1987 | Benedet | E04G 21/3261 | 182/36 |
| 4,860,518 | A | * | 8/1989 | Kingham | E04D 15/025 | 52/749.12 |
| 4,942,943 | A | * | 7/1990 | Flaherty | A62B 35/04 | 248/539 |
| 5,054,576 | A | * | 10/1991 | Glynn | E04G 21/3276 | 248/237 |
| 5,143,170 | A | | 9/1992 | Hunt | | |
| 5,143,171 | A | * | 9/1992 | Glynn | A62B 35/04 | 52/27 |
| 5,219,039 | A | * | 6/1993 | Bell | E04G 21/3261 | 182/112 |
| 5,287,944 | A | * | 2/1994 | Woodyard | E04D 13/12 | 248/237 |
| 5,297,651 | A | * | 3/1994 | Vandelinde | A62B 35/0056 | 182/36 |
| 5,361,866 | A | * | 11/1994 | Bell | E04G 5/00 | 182/36 |
| 5,636,704 | A | * | 6/1997 | Castaneda | E04G 21/3295 | 182/5 |
| 5,730,407 | A | * | 3/1998 | Ostrobrod | A62B 35/0043 | 248/237 |
| 6,286,273 | B1 | * | 9/2001 | Villela | F24F 7/02 | 454/365 |
| 6,520,290 | B1 | * | 2/2003 | Carter | A62B 35/0062 | 182/36 |
| 6,668,509 | B1 | * | 12/2003 | Krebs | E04D 13/12 | 52/703 |
| 6,763,910 | B2 | * | 7/2004 | Cole | E04G 21/3276 | 248/237 |
| 6,786,020 | B2 | * | 9/2004 | Poldmaa | E04D 13/12 | 52/704 |
| 8,636,108 | B2 | * | 1/2014 | Foster, Sr. | E04G 21/3276 | 182/45 |
| 8,997,406 | B2 | | 4/2015 | Vidal | | |
| 9,926,707 | B1 | * | 3/2018 | Knight, Jr. | E04F 13/12 | |
| 2004/0050620 | A1 | * | 3/2004 | Luke | A62B 35/0056 | 182/45 |
| 2008/0042030 | A1 | * | 2/2008 | Holling | E04G 21/3261 | 248/237 |
| 2008/0222972 | A1 | * | 9/2008 | Crookston | E04C 3/17 | 52/715 |
| 2010/0012427 | A1 | * | 1/2010 | Julliard | A62B 35/0068 | 182/82 |
| 2010/0133040 | A1 | * | 6/2010 | London | E04G 21/3261 | 182/3 |
| 2011/0314769 | A1 | * | 12/2011 | Foster, Sr. | E04G 21/3261 | 52/749.12 |
| 2013/0219812 | A1 | * | 8/2013 | Goodman | F24S 25/613 | 52/173.3 |
| 2017/0342718 | A1 | * | 11/2017 | Erekson | E04D 13/1476 | |
| 2017/0350127 | A1 | * | 12/2017 | Lowe | E04D 13/174 | |
| 2019/0218800 | A1 | * | 7/2019 | Bendall | E04G 3/22 | |

FOREIGN PATENT DOCUMENTS

| | | | | | |
|---|---|---|---|---|---|
| FR | 2766223 | | | 1/1999 | |
| GB | 2 328 664 | | | 3/1999 | |
| JP | H06312029 | A | * | 11/1994 | |
| JP | H11347139 | A | * | 12/1999 | |
| WO | WO2002/044496 | | | 6/2002 | |
| WO | WO-2004067095 | A1 | * | 8/2004 | A62B 35/0056 |
| WO | WO2006/021794 | | | 3/2006 | |
| WO | WO2013/159888 | | | 1/2014 | |

* cited by examiner

FALL PROTECTION SYSTEM

CROSS REFERENCES

This Application is a national stage filing under 35 U.S.C. § 371 of international application PCT/CA2019/050210, filed Feb. 20, 2019, which claims priority to U.S. Provisional Patent Application No. 62/632,781, entitled "Fall Protection System", filed Feb. 20, 2018, each of which is hereby incorporated by reference in its entirety.

FIELD OF THE INVENTION

The present disclosure relates to a fall protection system for installation on elevated structures and buildings and more particularly, on roofs of buildings.

Background of the Invention

Operative access to elevated structures, such as roof areas, is a major source of danger during building construction, inspection, and maintenance procedures, especially on sloping roofs. Falls from elevated structures are a common contributor to injuries and fatalities in the construction industry. Fall protection systems are therefore used to mitigate the risks of such accidents. Known fall protection systems fall into two main categories: (i) discrete and/or points and (ii) continuous coverage. Individual anchors fall in the first category and cable safety systems and safety rail systems are in the second category.

The cable safety systems are fitted to structures by posts supporting the cable at regular intervals. A cable safety system is able to permit a user access to large areas of a structure such as a roof, and enables a user to change direction to access a particular region of the structure without the need to detach from the safety system. However, when a load is applied to the cable by a person attached to a safety line, the load is transferred through the cable into the posts and so into the structure, such as a roof. The loads are typically very high and so can potentially damage the building structure. Although cable systems are reasonably inexpensive to manufacture and install, they can also be rather obtrusive and impact upon the aesthetic qualities of a building or other structure. The use of cable safety systems is limited by the cable deflection that occurs when a person falls. This restricts the use of cable systems on relatively low level structures as a user may strike the ground before their fall is arrested or system deflection may permit the user to fall in a travel restraint situation.

Known safety rail systems comprise a safety rail or track to which a safety rail traveler and associated safety line may be attached. Safety rail systems use a solid beam or track and have a low profile when mounted, in contrast to flexible cable safety systems. EP 0 593 150 describes a roof safety system in which a rail is provided at the ridge of a pitched roof. A traveler, such as that disclosed in GB 2 328 664, is slideably mounted on the rail, so that a person working on either side of the pitched roof can secure a safety line to the traveler for protection from falling off the roof. Although rail and traveler systems provide the advantage of an attachment point which is easily moved to any position along the length of a roof ridge, the prior art roof safety systems require special fixings and are not readily retrofitted to an existing roof.

Further, most cable and rail systems are not approved for use or are not permitted in many jurisdictions for the in-air suspension of workers. A boatswain's chair is an example of such a system.

Still further, many existing fall protection systems do not have waterproofing integrated into their designs.

WO2002/044496 discloses a safety rail system which can be installed on a sloping roof and provides a continuous rail to which a safety rail traveler and associated safety line may be attached. The system comprises one or more longitudinal base units, of substantially uniform cross section adapted to be fixed to the surface of a roof, and one or more longitudinal rail units of substantially uniform cross section adapted to allow the attachment of a safety rail traveler.

WO2006/021794 discloses a safety rail system that includes at least two rail members arranged end-to-end and a spigot securing together adjacent rail members.

WO2013/159888 discloses an integrated safety system for roofers of buildings comprising an elongate ridge cap having a profile along the top adapted to provide a track for a shuttle.

There is a need for a fall protection system which enables a user to access large areas of a structure without detachment from the system; which can safely suspend a worker in the air; which selectively allows suspension or fall protection at a discrete location or provides continuous coverage, either provided as standalone options or within the same system design; which can be easily and permanently installed on a new roof or retrofitted to an existing roof; which can be easily replaced in parts when necessary; which includes integrated means for waterproofing; and which may include integrated means for ventilation if desired.

SUMMARY OF THE INVENTION

The present disclosure aims to provide a fall protection system that overcomes the drawbacks of the prior art.

According to a broad aspect of the present disclosure, there is provided a fall protection system for use on a structure comprising: a module comprising: a structural sheet having a ridge with two lengthwise sides, one or both of the lengthwise sides having a respective attachment panel extending laterally therefrom, the attachment panel being attachable to the structure; and one or both of: (i) an anchorage connector attached to the ridge; and (ii) at least one rail clamp attached to the ridge; a rail supported by the at least one rail clamp; and a slider supported on the rail, the slider being slideably movable axially along the rail, and the slider having a slider anchorage connector.

According to another broad aspect of the present disclosure, there is provided a method for assembling a fall protection system, the method comprising: attaching an attachment panel of a structural sheet to a structure, the structural sheet comprising a ridge having two lengthwise sides, the attachment panel extending laterally from one of the lengthwise sides; and one or both of: (i) attaching an anchorage connector to ridge; and (ii) feeding a rail through a plurality of rail clamps; attaching the plurality of rail clamps to the ridge; and placing a slider on the rail, the slider being slideably movably axially along the rail, the slider having a slider anchorage connector.

According to yet another broad aspect of the present disclosure, there is provided a kit for a fall protection system, the kit comprising: a structural sheet having a ridge with two lengthwise sides, one or both of the lengthwise sides having a respective attachment panel extending laterally therefrom, and one or both of: (i) an anchorage connector for attachment to the ridge; and (ii) at least two rail clamps for attachment to the ridge; a rail supportable by the at least two rail clamps; and a slider supportable on the rail and slideably movable axially along the rail, and the slider having a slider anchorage connector.

According to one aspect, the module further comprises a flashing ridge having two lengthwise sides and wherein the flashing ridge is attached to the ridge.

According to another aspect, one or both of the lengthwise sides of the flashing ridge have a respective flashing extending laterally therefrom.

According to yet another aspect, the fall protection system further comprises a vent.

BRIEF DESCRIPTION OF THE DRAWINGS

The invention will now be described by way of an exemplary embodiment with reference to the accompanying simplified, diagrammatic, not-to-scale drawings. Any dimensions provided in the drawings are provided only for illustrative purposes, and do not limit the invention as defined by the claims. In the drawings:

DETAILED DESCRIPTION OF THE INVENTION

Figure 1:
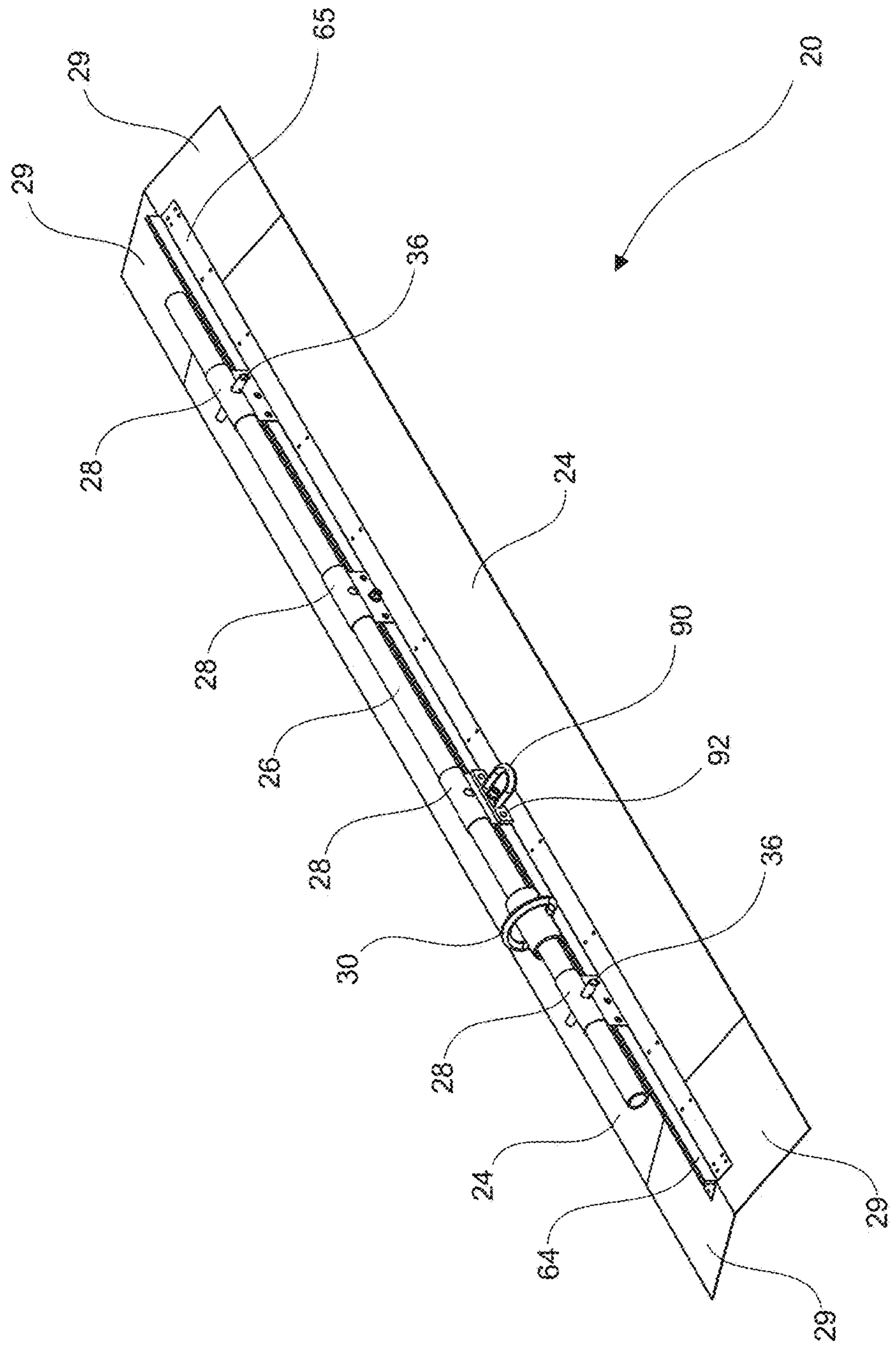
FIG. 1 is a top perspective view of a module of the fall protection system, according to one embodiment of the present disclosure.
Figure 2:
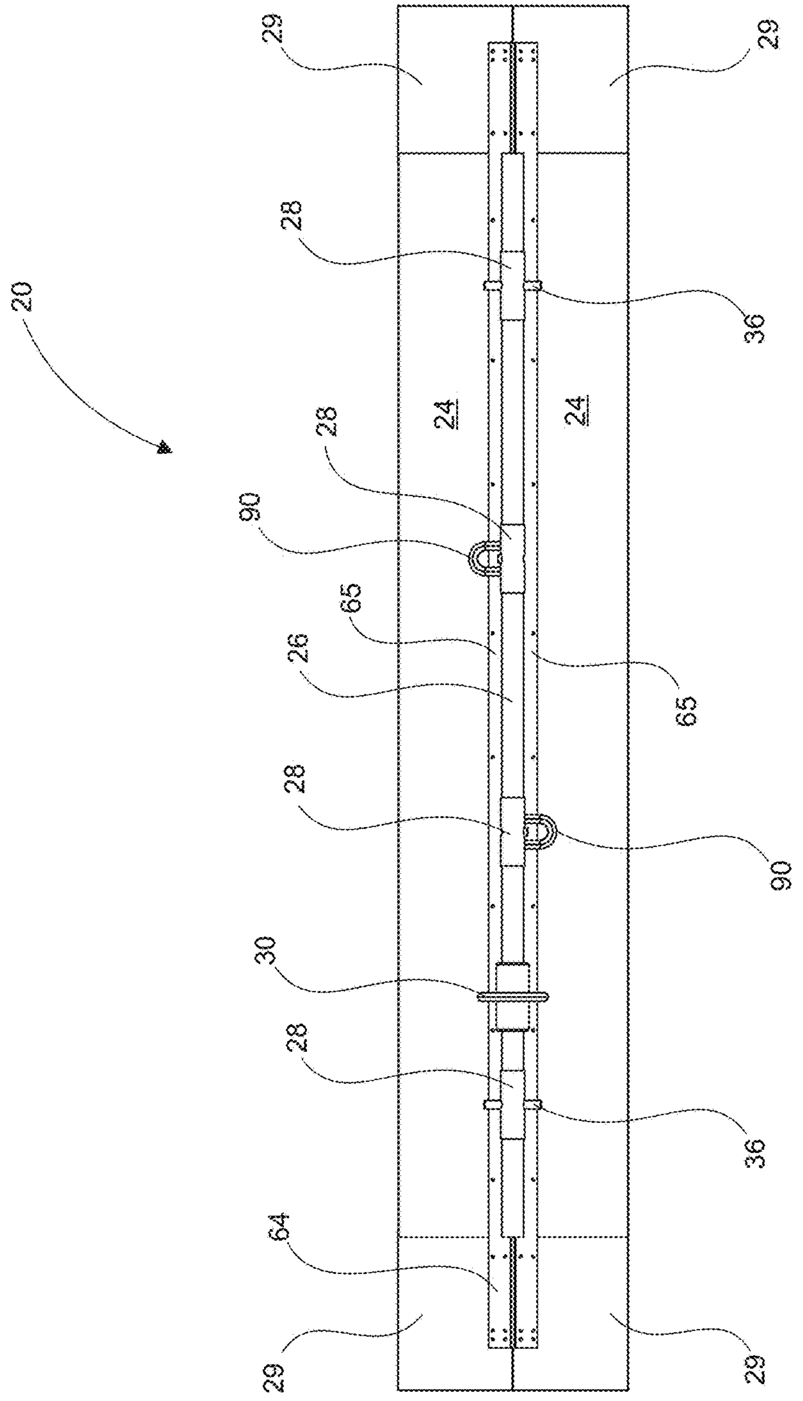
FIG. 2 is a top plan view of the module of FIG. 1.
Figure 3:
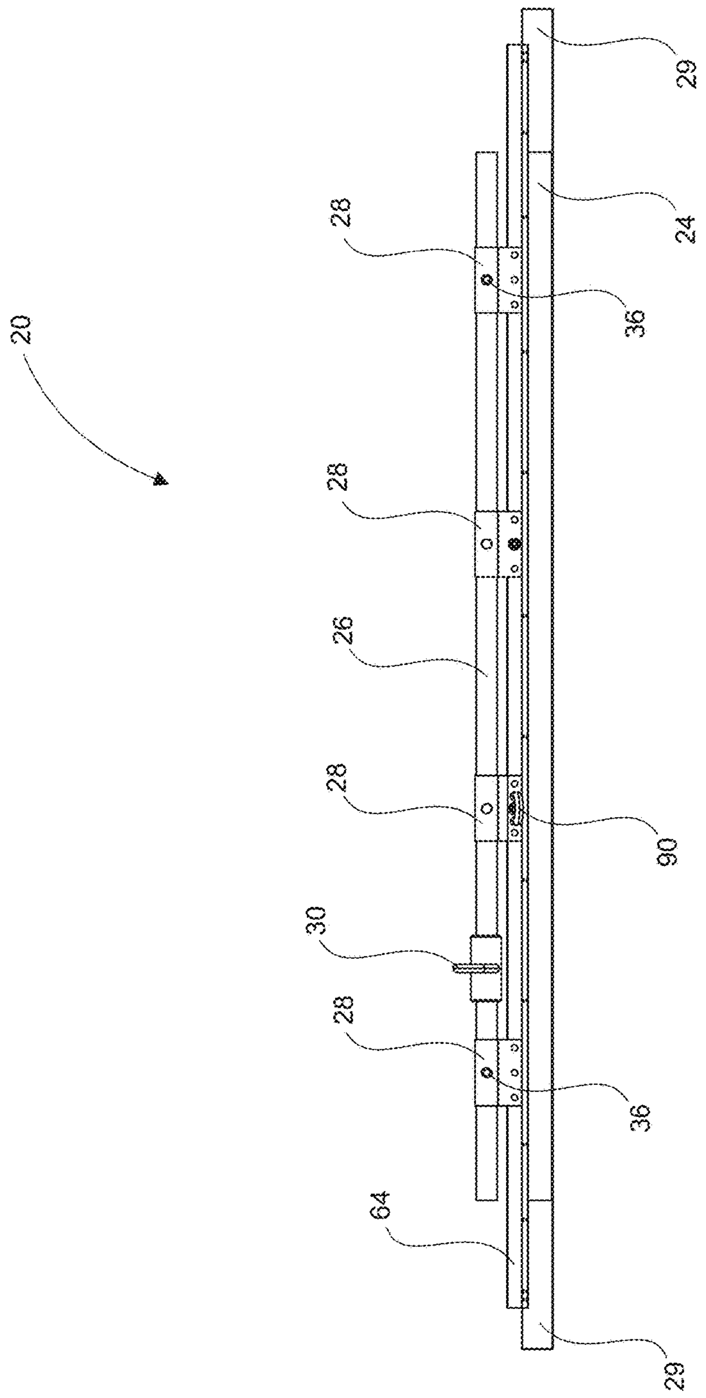
FIG. 3 is a side plan view of the module of FIG. 1.

When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the scope of the invention, as defined in the appended claims.

A fall protection system is provided and described herein with reference to FIGS. 1 to 13. The fall protection system, according to some embodiments, comprises one or more modules. A sample module 20 of the fall protection system is shown in FIGS. 1 to 4. The module 20 is also shown in FIGS. 5 to 9, but with some parts omitted. According to some embodiments, the module 20 comprises a structural sheet 22 (best shown in FIG. 4), a ridge 64, a rail 26, rail clamps 28, one or more sliders 30, and optionally flashings 24 (hereinafter, the "slider version"). In alternative embodiments, the module 20 comprises the structural sheet 22, one or more anchorage connectors 90, and optionally, the ridge 64 and flashings 24 (hereinafter, the "anchor version"). In some embodiments, the module 20 is a combination of the slider version and the anchor version and may comprise all of the above-mentioned components.

In the slider version, a person is attached to the slider using a safety line. In case of a fall, a force is exerted on the structural sheet via the slider, the rail, and the rail clamps and the resulting stress on the structural sheet causes the structural sheet and rail clamps to deform, thereby absorbing at least some of the energy of the fall and thus reducing the risk of injury to the person. As will be explained in more detail below, the slider version provides continuous coverage of an area such that the person can freely and safely move around in the area.

In the anchor version, the person is attached to the anchorage connector via a safety line, harness (including, for example, a boatswain's chair), which allows the person to suspend in mid-air at the location of the anchorage connector from the side of the module on which the anchorage connector is mounted. The anchor version additionally provides travel restraint and fall arrest for the person at a discrete location in both axial directions of the ridge.

The fall protection system described herein is designed to have the ability and flexibility to incorporate one or both of the anchor version and the slider version. Therefore, the fall protection system may be configured to provide one or both of: (i) fall arrest and suspension at a discrete location in the anchor version; and (ii) continuous fall protection coverage in the slider version.

The present disclosure aims to provide a fall protection system that: may considerably reduce the installation times on varying structures including but not limited to newly built roofs and on existing roofs; may be applied to roofs of various types and age; may offer a greater assurance of waterproofing of the roof; may provide greater assurances of reliability and safety in use; can be manufactured easily using commonly commercially available elements and materials and is furthermore competitive from an economic standpoint; selectively allows in-air suspension or fall arrest at a discrete location or continuous coverage via a slider and rail arrangement from the same module connected to the building structure.

With reference to FIGS. 5 to 9, the structural sheet 22 of module 20 is an elongated sheet of material for attachment to a building structure, for example at the trusses of the building structure such as the principal rafters and/or common rafters of a roof structure. The structural sheet 22 may also be attached to the roof sheathing, roof panels, or other attachments to the underlying structure. Structural sheet 22 has two attachment panels 50 separated lengthwise by an axially extending ridge 54. In other words, each attachment panel 50 extends laterally from the ridge 54. The two panels 50 may or may not have the same dimensions. In some embodiments, each attachment panel 50 has a plurality of attachment locations 33 intermittently positioned and spaced apart along its length. Each attachment location 33 has a one or more apertures 34, at least one of which may receive a fastener therethrough. For simplicity, fasteners are not shown in the Figures.

The ridge 54 has a plurality of attachment sections intermittently positioned and spaced apart along its length.

Each attachment section has one or more apertures each for receiving a fastener therethrough. The ridge 54 is for supporting the ridge 64, the rail clamps 28, and/or the one or more anchorage connectors 90.

Figure 8:
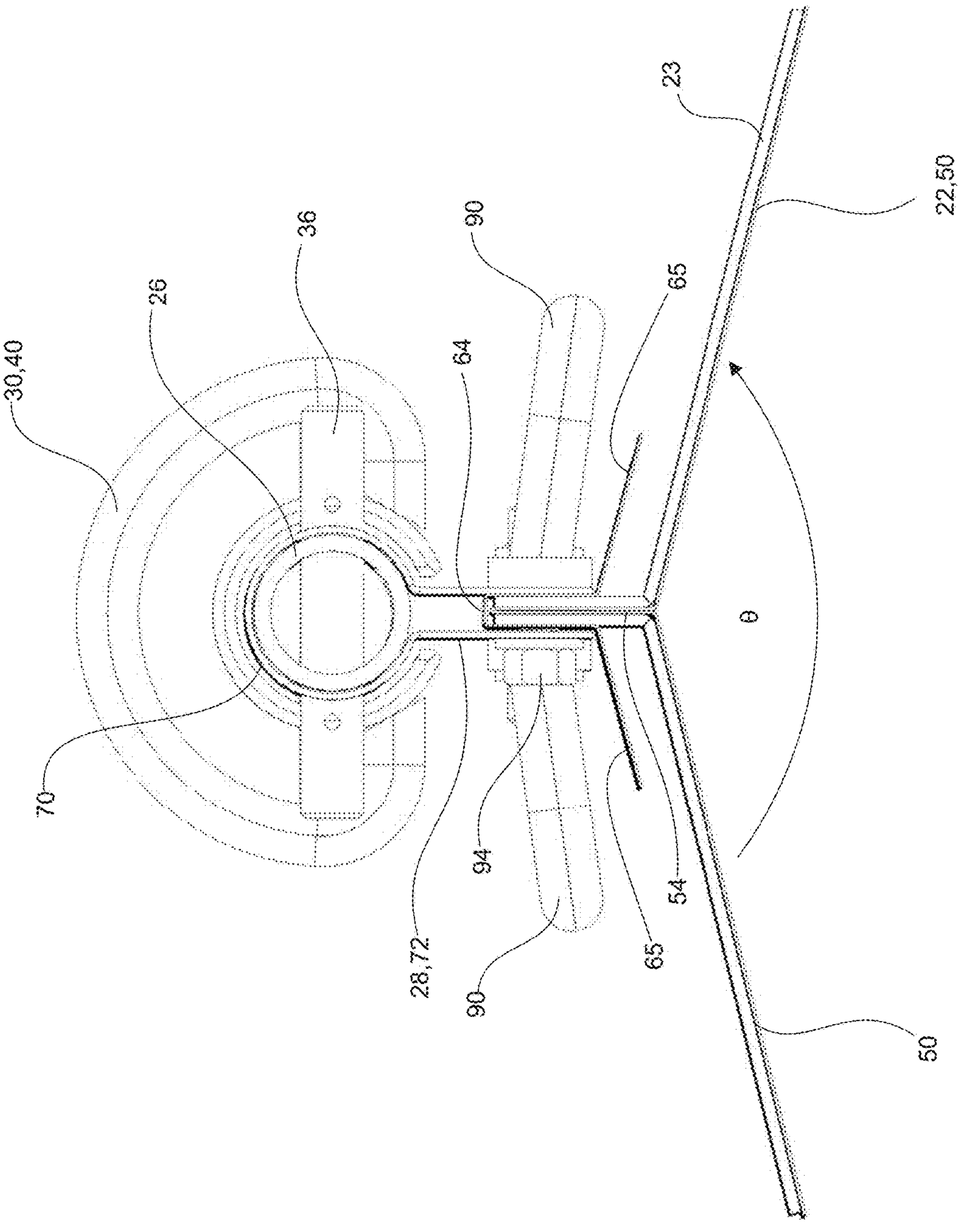
FIG. 8 is an end view of the module of FIG. 5.
Figure 9:
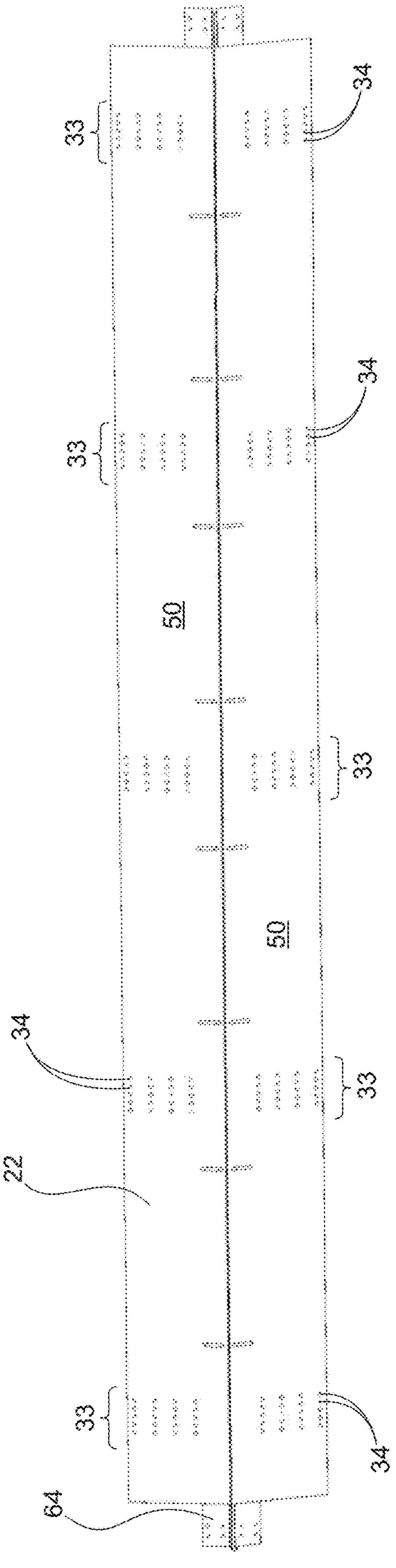
FIG. 9 is a bottom plan view of the module of FIG. 5.

In the illustrated embodiment, as best shown in FIG. 8, an angle θ is defined between the inner faces of the attachment panels 50. The inner face is the face that is adjacent to the building structure when the structural sheet 22 is attached to the building structure. The angle θ may range from about 0° to about 180° depending on the shape of the building structure to which structural sheet 22 is to be attached (e.g. the pitch of a roof). In other embodiments, the angle θ may range from about 50° to about 180°. Angle θ may also vary between different structural sheets.

In some embodiments, the structural sheet 22 is formed by folding and bending a single sheet of material. For example, a sheet of metal may be folded in half and bent lengthwise laterally at a distance from the fold to form the ridge 54 along the fold and the panel 50 on each lengthwise side of the ridge 54. While the illustrated embodiment shows two attachment panels 50, structural sheet 22 may only have one attachment panel in other embodiments.

While structural sheet 22 is shown in the illustrated embodiment as a piece of material that is substantially continuous axially, in some embodiments there may be gaps in the structural sheet 22 and/or in one or both of the attachment panels 50 to provide direct access to the building structure. Further, while structural sheet 22 is shown to have substantially rectangular panels 50, it can be appreciated that panels 50 may be of other shapes. Still further, ridge 54 and/or attachment panels 50 may be of any length. Furthermore, the positions of attachment locations 33 and/or the attachment sections of ridge 54 may be varied to accommodate different underlying structures and/or the intended fall protection function of the system. In some embodiments, the structural sheet 22 is made of stainless steel, steel, aluminum, or any other suitable material as known to those skilled in the art.

In embodiments, with reference to FIGS. 5 to 8, the module 20 may have one or more stiffeners 23 to enhance the structural integrity and strength of the structural sheet 22. The stiffener 23 may be attached to the ridge 54 at one of the attachment sections thereof. In some embodiments, the stiffener 23 has a stiffener ridge and a stiffener panel extending laterally from the stiffener ridge. The stiffener ridge has one or more apertures for alignment with the one or more apertures in one of the attachment sections of the ridge 54. The stiffener 23 can thus be attached to the ridge 54 by aligning the one or more apertures in the stiffener ridge and the ridge 54 and installing fasteners at the one or more aligned apertures. In embodiments, the stiffener panel is configured to lie flat against the surface of the corresponding attachment panel when the stiffener ridge is attached to the ridge 54. Stiffener 23 may be made of stainless steel, steel, aluminum, or any other suitable material as known to those skilled in the art.

In some embodiments, with reference to FIGS. 1 to 4, module 20 comprises two flashings 24 connected at a lengthwise side thereof by the axially extending flashing ridge 64 such that flashings 24 extend laterally outwardly from the lengthwise sides of the ridge 64. For example, the flashing 24 may be an elongated sheet of material. Together, the ridge 64 and the flashings 24 provide weather-resistant coverage and protection for structural sheet 22 and building envelope (not shown). The flashings 24 may be secured to the ridge 64 by fasteners, adhesives, welding, or other methods known to those in the art. In other embodiments, the flashings 24 and the ridge 64 may be integrated such that they are not separate components. For example, the flashings 24 and ridge 64 may be formed by folding and bending a single sheet of material, such as a sheet of metal that is folded in half and bent lengthwise laterally at a distance from the fold to form a ridge along the fold and a flashing on each side of the ridge.

In the illustrated embodiment, the ridge 64 has a laterally extending side flange 65 at each lengthwise side thereof for connecting with a lengthwise side of one of the flashings 24. The ridge 64 has a plurality of attachment sections intermittently positioned and spaced apart along its length. Each attachment section has one or more apertures, each for receiving a fastener therethrough. The ridge 64 may be configured such that it can be axially aligned with the ridge 54 of the structural sheet 22. In some embodiments, the ridge 64 has an inner facing channel which is configured for receiving ridge 54 (and the stiffener ridge, if stiffener 23 is included) of the structural sheet 22 therein. The one or more apertures are spaced along the ridge 64 to align with the one or more apertures of ridge 54 and the stiffener ridge when ridge 54 and the stiffener ridge are received in the channel of ridge 64, such that a fastener can be received through an aligned array of apertures to thereby secure the structural sheet 22 to the ridge 64. It can be appreciated that the positions of attachment sections of ridge 64 are configured to coincide with the attachment sections of ridge 54, and may be varied to accommodate different building structures.

Figure 5:
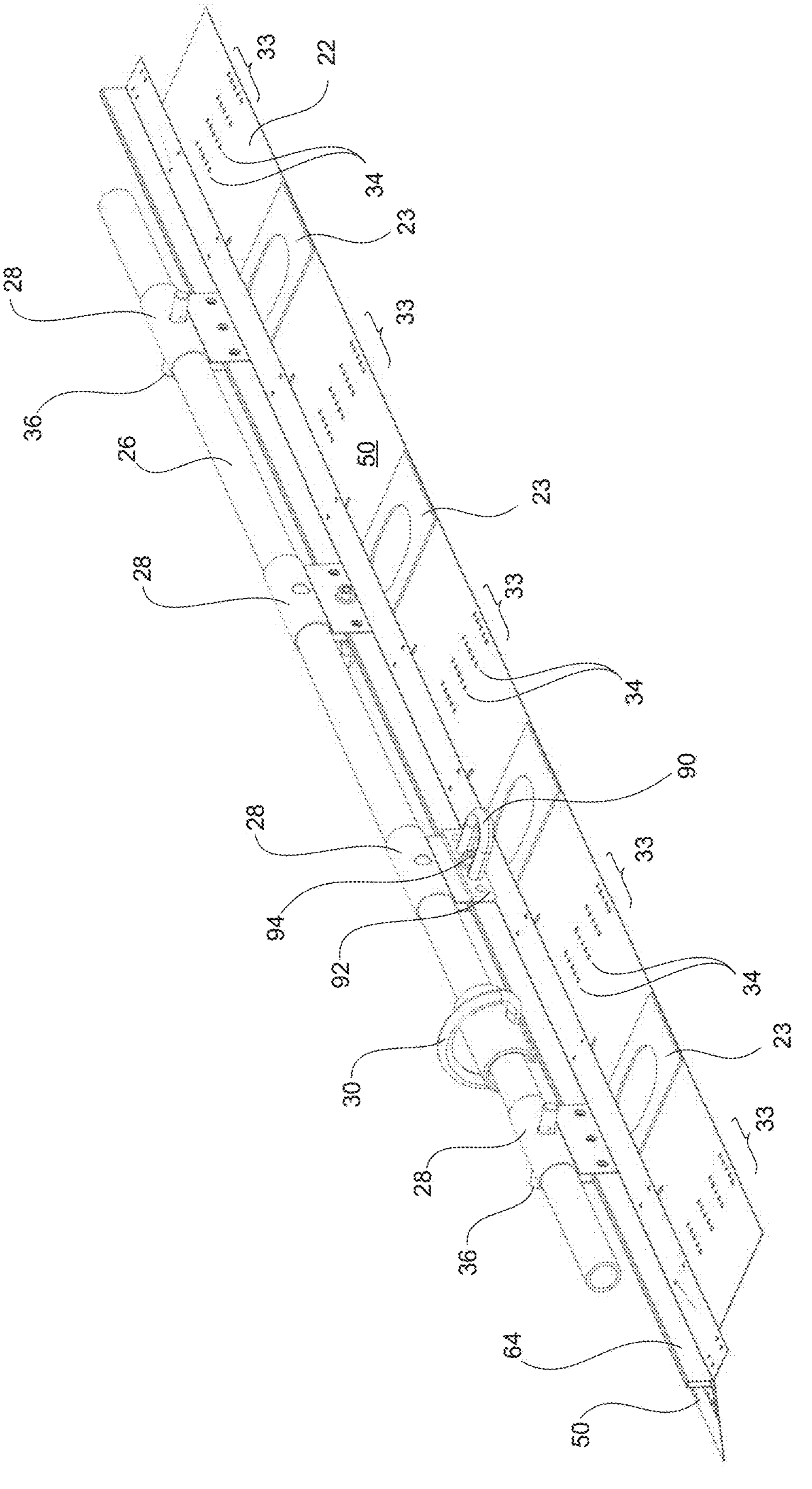
FIG. 5 is a perspective view of the module of FIG. 1, shown without flashings.
Figure 6:
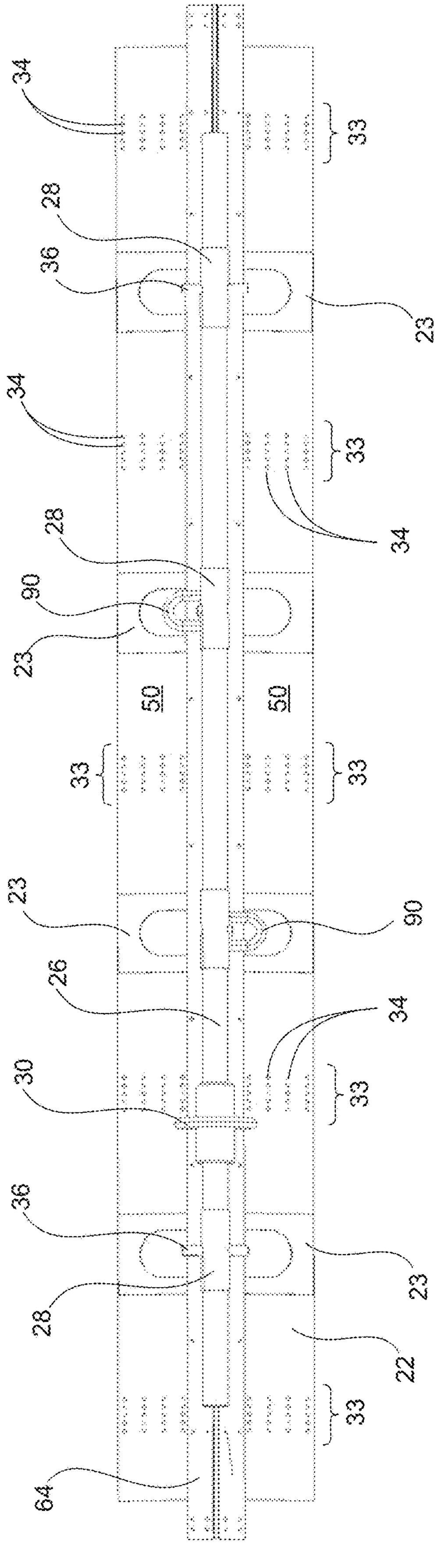
FIG. 6 is a top plan view of the module of FIG. 5.
Figure 7:
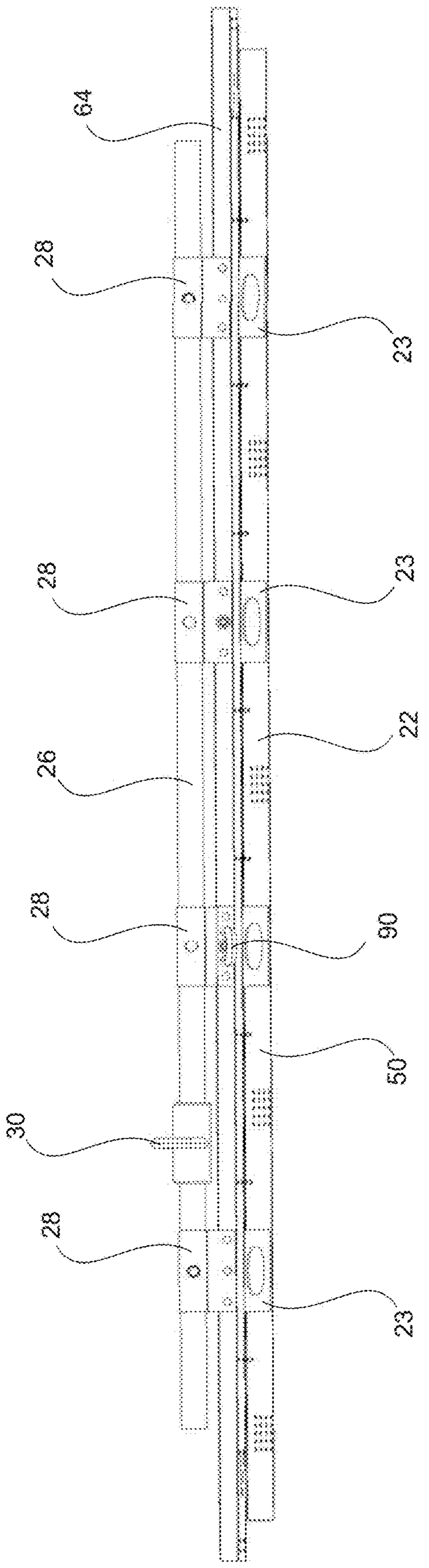
FIG. 7 is a side plan view of the module of FIG. 5.

In some embodiments, as best shown in FIGS. 5 to 7, the length of ridge 64 is greater than the length of the attachment panels 50 such that the ends of ridge 64 extend axially beyond the corresponding ends of the panels 50.

As best shown in FIGS. 1 to 4, the flashings 24 are configured to provide physical coverage for structural sheet 22 to protect structural sheet 22 and the building envelope from water and the elements and to prevent precipitation from entering the apertures 34. In the illustrated embodiment, when ridge 54 is received in the channel of ridge 64 and when the flashings 24 are attached to the lengthwise sides of ridge 64, flashings 24 substantially cover the outer faces of attachment panels 50 but a gap G is maintained between each flashing 24 and its adjacent attachment panel 50. The size of gap G, i.e. the distance between the inner face of flashing 24 and the outer face of the adjacent attachment panel 50, may vary throughout the surface area of the flashings 24 and attachment panels 50. However, in most embodiments, the size of gap G is greater than 0. To help maintain the gap G between the flashings 24 and attachment panels 50, the depth of the channel of ridge 64 is less than the height of ridge 54 such that a portion of the ridge 54 extends beyond the channel of ridge 64. Ridge 64 may be of any length. In some embodiments, the module 20 may include a spacer (not shown) in between each attachment panel 50 and its corresponding flashing 24 to help maintain the gap G.

While flashings 24 are shown to be substantially mirror images of one another, the two flashings 24 may or may not have the same dimensions in other embodiments. In embodiments, the flashings 24 are shaped and sized to cover most or all of the surface of panels 50. The surface area of flashing 24 may be larger or at least the same as that of its corresponding panel 50. In one embodiment, the width and length of the flashing 24 are greater than those of its corresponding panel 50 such that the free side and ends of the flashing 24 extend laterally and axially, respectively, beyond those of the corresponding panel 50. Further, even though each flashing 24 is shown in the illustrated embodiment as a piece of material that is substantially continuous axially, in some embodiments there may be gaps in the flashing 24 depending on the position of the structural sheet 22. Still further, while flashings 24 are shown to be substantially rectangular in shape, it can be appreciated that flashings 24 may be of any length and/or shape as long as they provide substantial coverage for panels 50.

In some embodiments, the flashings 24 and/or the ridge 64 are made of stainless steel, plastic, galvanized steel, painted steel, steel, or a combination thereof. Further, it can be appreciated that where the structural sheet 22 has only one attachment panel 50, only one flashing 24 is necessary to protect that panel. In some embodiments, flashings 24 may be omitted if the module 20 is to be used where precipitation or other elements are not a concern; for example, flashings 24 can be omitted if module 20 is to be installed indoors.

Figure 10:
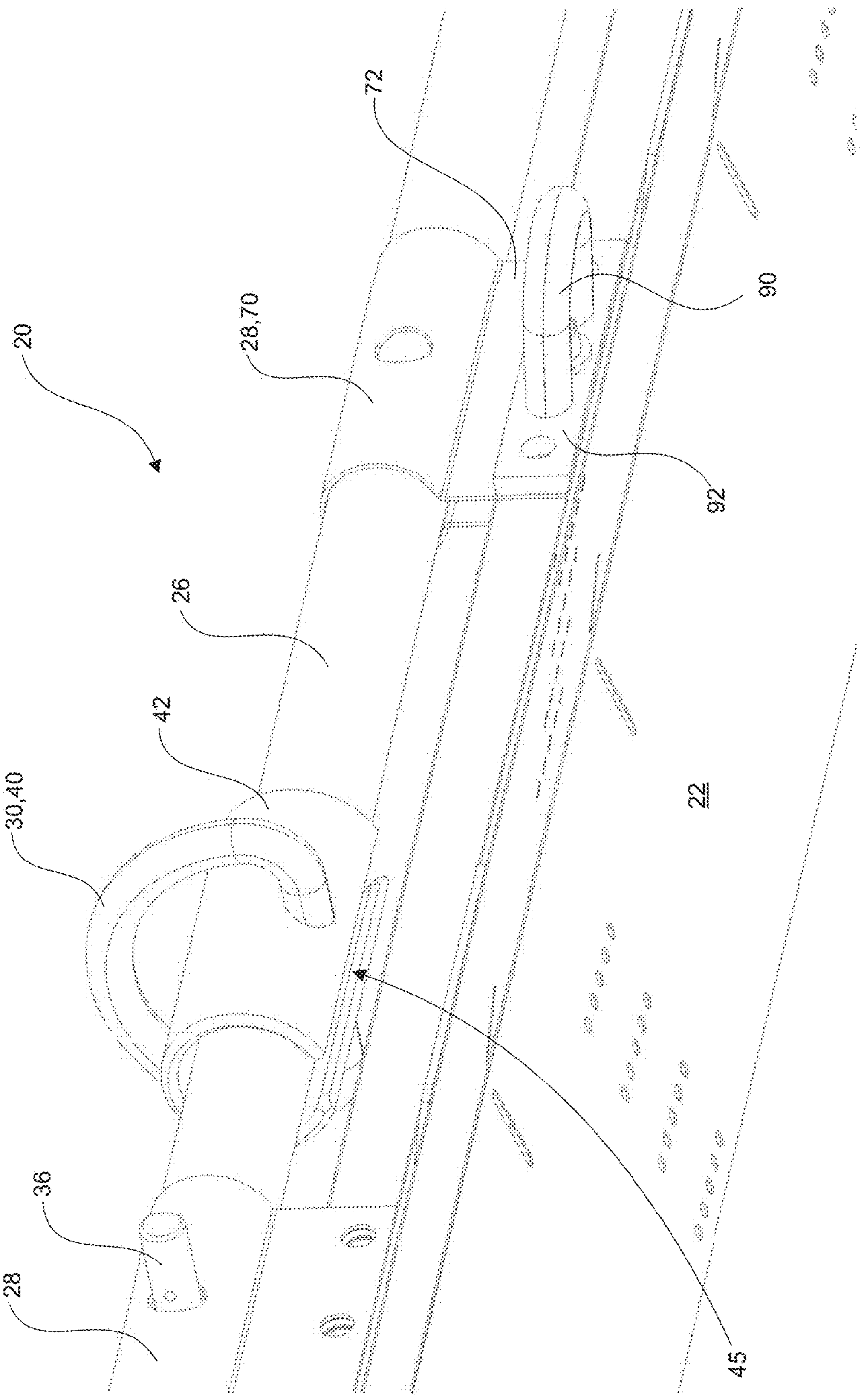
FIG. 10 is a detailed view of a slider and an anchorage connector of the module of FIG. 5.

With reference to FIGS. 1 to 8, the module 20 may further comprise the rail 26 and rail clamps 28 for supporting the rail 26. As best shown in FIGS. 8 and 10, each rail clamp 28 has a sleeve portion 70 and a leg portion 72. The sleeve portion 70 has a through bore for receiving a lengthwise section of the rail 26. The leg portion 72 is for attachment to the ridge 54 of structural sheet 22 and the ridge 64. In the illustrated embodiment, the leg portion 72 has two legs extending from the sides of a gap in the circumference of the sleeve portion 70. Each leg of the leg portion 72 has one or more apertures for receiving fasteners therethrough and in alignment with the one or more apertures of the other leg. The one or more apertures of each leg are configured and spaced for alignment with the one or more apertures of the ridges 54, 64 when the leg portion 72 straddles the ridge 64 with one leg on each lengthwise side of the ridge 64.

With reference to FIGS. 1 to 8, the rail 26 is an elongated member for supporting one or more sliders 30 thereon. Slider 30 may sometimes be referred to as a mobile anchorage connector. While the rail 26 is shown to be a tubular member with a through bore, rail 26 may be of other shapes and/or solid construction, such as a solid rod or extrusion, in some embodiments. The outer diameter of rail 26 is sized to be receivable inside the sleeve portion 70 of the rail clamps 28 and vice versa, and the gap in the sleeve portion 70 may facilitate the installation of the rail clamps 28 over the outer surface of the rail 26. In some embodiments, rail 26 may include one or more weep holes (not shown) on the underside thereof to prevent water from collecting inside the rail, thereby reducing the likelihood of corrosion and ice-jacking.

As best shown in FIG. 10, one or more sliders 30 are supported on rail 26. Each slider 30 comprises a slider sleeve 42 and a slider anchorage connector 40 supported on the slider sleeve 42. Sleeve 42 has a through bore sized to allow the sleeve portion 70 of the rail clamps to easily pass therethrough. There is a gap 45 in the circumference of sleeve 42 that is sized to fit the leg portion 72 of the rail clamps therethrough. Therefore, when sleeve 42 is supported on rail 26, which in turn is supported by rail clamps 28, sleeve 42 is slideably movable axially along rail 26 without being obstructed by the rail clamps 28 since the gap 45 in sleeve 42 allows the leg portion 72 to pass therethrough while the sleeve 42 slides past and around the rail clamps 28. The slider anchorage connector 40, which is securely attached to sleeve 42, provides an attachment point for a safety line (not shown). The slider anchorage connector 40 may be welded to the sleeve 42 but other modes of attachment are possible. In some embodiments, slider anchorage connector 40 and sleeve 42 are integrated such that they are part of the same component.

The module 20 may have a plurality of sliders 30 to provide two or more attachment points to which safety lines may attach. Having a plurality of sliders 30 allows more than one person to access the same building structure at a given time and/or provides redundancy in case of unexpected failure of one of the sliders or safety lines.

To stop the slider 30 from sliding beyond a certain axial location of the rail 26, the module 20 comprises one or more stop rods 36. For example, the one or more stop rods 36 help prevent the slider(s) 30 from sliding off at least one end of the rail 26. In the illustrated embodiment, as best shown in FIGS. 1 to 4, the stop rod 36 is an elongated member extending through aligned apertures in one of the rail clamps 28 and the rail 26, such that at least one end of the stop rod extends radially outwardly from the outer surface of the rail clamp 28. In embodiments, the length of the stop rod 36 is selected such that it is at least the same as or greater than the outer diameter of the sleeve 42, and the stop rod 36 is positioned such that both ends extend radially outwardly from the outer surface of rail clamp 28. The module 20 may have a stop rod 36 extending laterally through each outermost rail clamp to restrict the axial movement of the slider 30 to be only between the stop rods 36. In other embodiments, the module 20 may further comprise additional stop rods at different axial locations of the rail 26. This may be useful where the module 20 has multiple sliders 30. For example, by positioning one of the sliders 30 in between a pair of adjacent stop rods 36, the axial movement of that slider 30 can be limited to only between the pair of stop rods 36.

While the illustrated embodiment shows the stop rod 36 as penetrating laterally through the rail 26 and the rail clamp 28, in other embodiments the stop rod 36 can be positioned at an axial location where the stop rod 36 only penetrates the rail 26. Further, in some embodiments, the stop rod 36 does not extend through the rail 26 or the rail clamp 28. For example, the stop rod 36 may be one or more protrusions on the outer surface of the rail 26 or the sleeve portion 70, such as one or more pieces of material attached to the outer surface of the rail 26 or sleeve portion 70 that extend radially outwardly therefrom. Furthermore, the protrusions may or may not be symmetric about an axial axis of the rail 26. In embodiments, the length of each protrusion is at least the same as or greater than the outer radius of the sleeve 42 or the thickness of the material of sleeve 42.

In some embodiments, the module 20 comprises one or more anchorage connectors 90, in addition to or in lieu of the rail 26, rail clamps 28, and slider 30, and each anchorage connector 90 provides an attachment point for a safety line (not shown). In the embodiment shown in FIGS. 1 to 4, module 20 has two anchorage connectors 90, each fixedly attached to the ridge 54 via the ridge 64 and the leg portion 72 of a rail clamp 28. In other embodiments, for example where rail clamps 28 are omitted or where an anchorage connector 90 is to be positioned somewhere between two adjacent rail clamps, one or more of the anchorage connectors may be fixedly attached directly to the ridge 64 or the ridge 54 (if ridge 64 is omitted). Further, while two anchorage connectors 90 are shown in the illustrated embodiment, the module 20 may include fewer or more anchorage connectors 90.

In the illustrated embodiment, each anchorage connector 90 has a base plate 92 having one or more apertures each for receiving a fastener 94 therethrough. The one or more apertures in the base plate 92 can be aligned with the one or more apertures of the ridge 54, and optionally the one or more apertures of a leg portion 72 (if the rail clamp 28 is present) and the one or more apertures of the ridge 64 (if ridge 64 is present). Therefore, when the fastener 94 is received in one of the apertures in base plate 92, the fastener 94 extends laterally through the ridge 54, from one side to the other, and optionally through the ridge 64 and/or the leg portion 72 of one of the rail clamps 28. One or more fasteners 94 may be used to secure each anchorage connector 90 to the ridge 54. In additional or alternative embodiments, the anchorage connector 90 may be welded to the ridge 54, ridge 64, or rail clamp 28. It can be appreciated that other ways of securing the anchorage connector 90 to the ridge 54 (and optionally the ridge 64 and/or rail clamp 28) are also possible.

Figure 11:
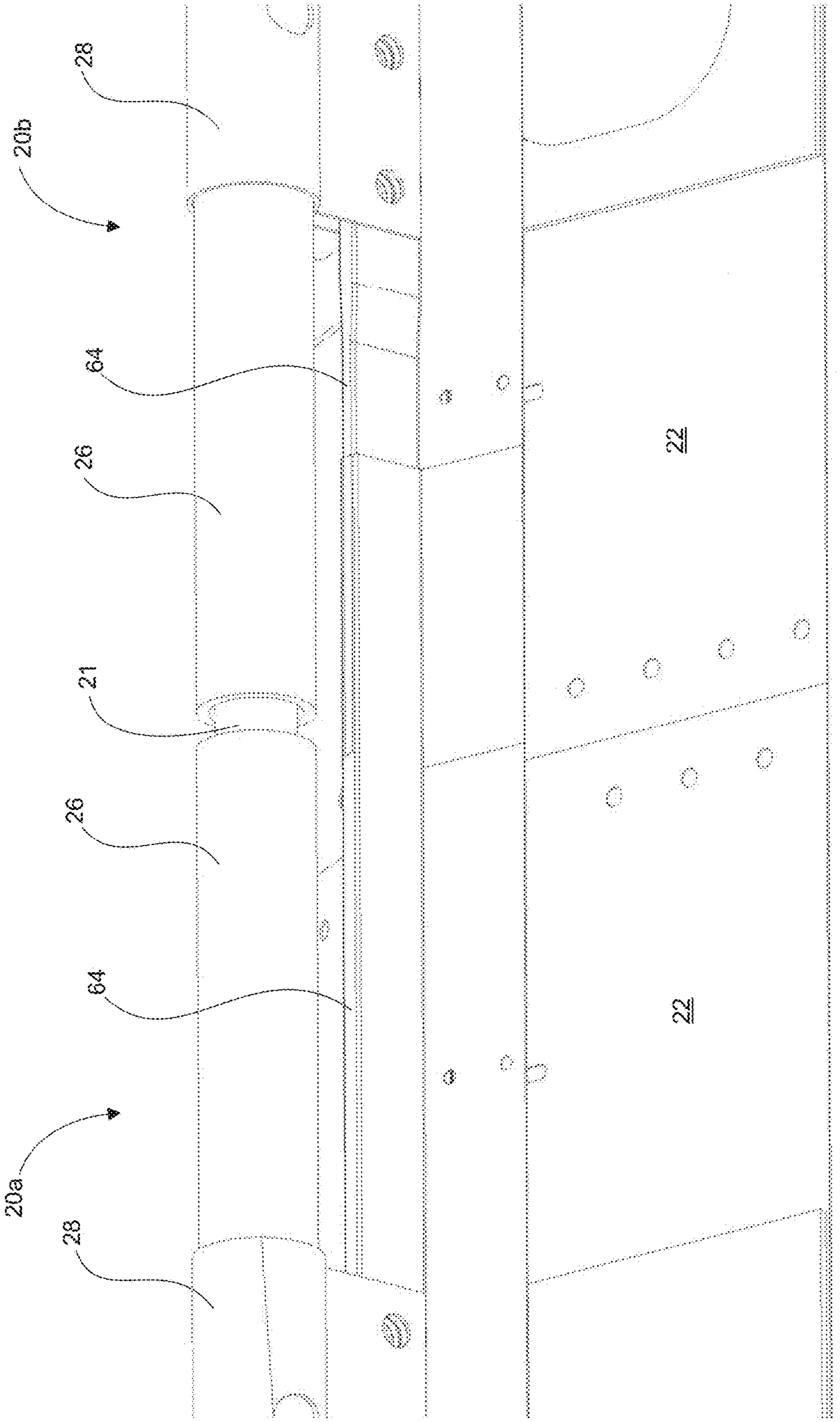
FIG. 11 is a zoomed-in view of the connection between two modules of the fall protection system, shown without flashings, according to an embodiment of the present disclosure.

With reference to FIG. 11, two or more modules 20*a*,20*b* may be joined together at one end to provide a fall protection system of a desired length. One end of the ridge 64 of one of the modules 20*b* may be thinner to allow a lap joint connection with the end of the ridge 64 of the adjacent module 20*a*. If the modules 20*a*,20*b* have rails 26, then one or both ends of the rail 26 of one of the modules 20*a* may be a male end 21, while the one or both ends of the rail 26 of the adjacent module 20*b* may be a female end. The male end 21 is sized to be receivable in the female end. As a result, the rails 26 of two adjacent modules 20*a*,20*b* can be interconnected by a spigot connection (i.e. by fitting the male end 21 of one module 20*a* into the female end of the rail 26 of the adjacent module 20*b*). Of course, other modes of connection that are known in the art may be used.

In some embodiments, when two modules 20*a*,20*b* are connected, their respective structural sheets 22 meet at one end. In other embodiments, when two modules 20*a*,20*b* are connected, their respective structural sheets may be selectively sized such that they do not meet at one end, thus leaving a gap between the structural sheets. In further embodiments, flashing 24 may or may not cover the gap between the structural sheets. In other words, flashing 24 may be substantially continuous axially across two modules 20*a*,20*b* or there may be a gap between the flashings 24 of two adjacent modules, whereby the modules are sealed from water ingress independently.

In some embodiments, with reference to FIGS. 1 to 4, the module 20 comprises one or more flashing end sheet 29 at one or both ends of the flashing 24. The flashing end sheet 29 is configured to help shed water at the end(s) of the fall protection system or in between modules if there is a large gap between adjacent flashings 24 or if the adjacent flashings are on different roof pitches. For example, if the fall protection system comprises only one module, a flashing end sheet 29 may be included at each end of the flashings 24 and the flashing end sheets 29 may extend axially beyond the ends of ridge 64. In another example, where the fall protection system comprises multiple modules, a flashing end sheet 29 may only be included at the outer end of the outermost flashings 24. In yet another example, where the fall protection system comprises multiple modules, each module may have flashing end sheets 29 at both ends, especially if there is a gap in the flashings 24 between adjacent modules. The flashing end sheet 29 may be connected to the end of the flashing 24 and where flashing 24 is connected to an adjacent flashing 24 by an S-lock or any other connection as known to those in the art that reduces water migration, allows expansion and contraction of the materials, and/or allows flashings 24 to be fastened to the building structure with hidden fasteners. In some embodiments, the end sheets 29 may be connected to each other, such that flashing 24 may be omitted from the module.

Figure 4:
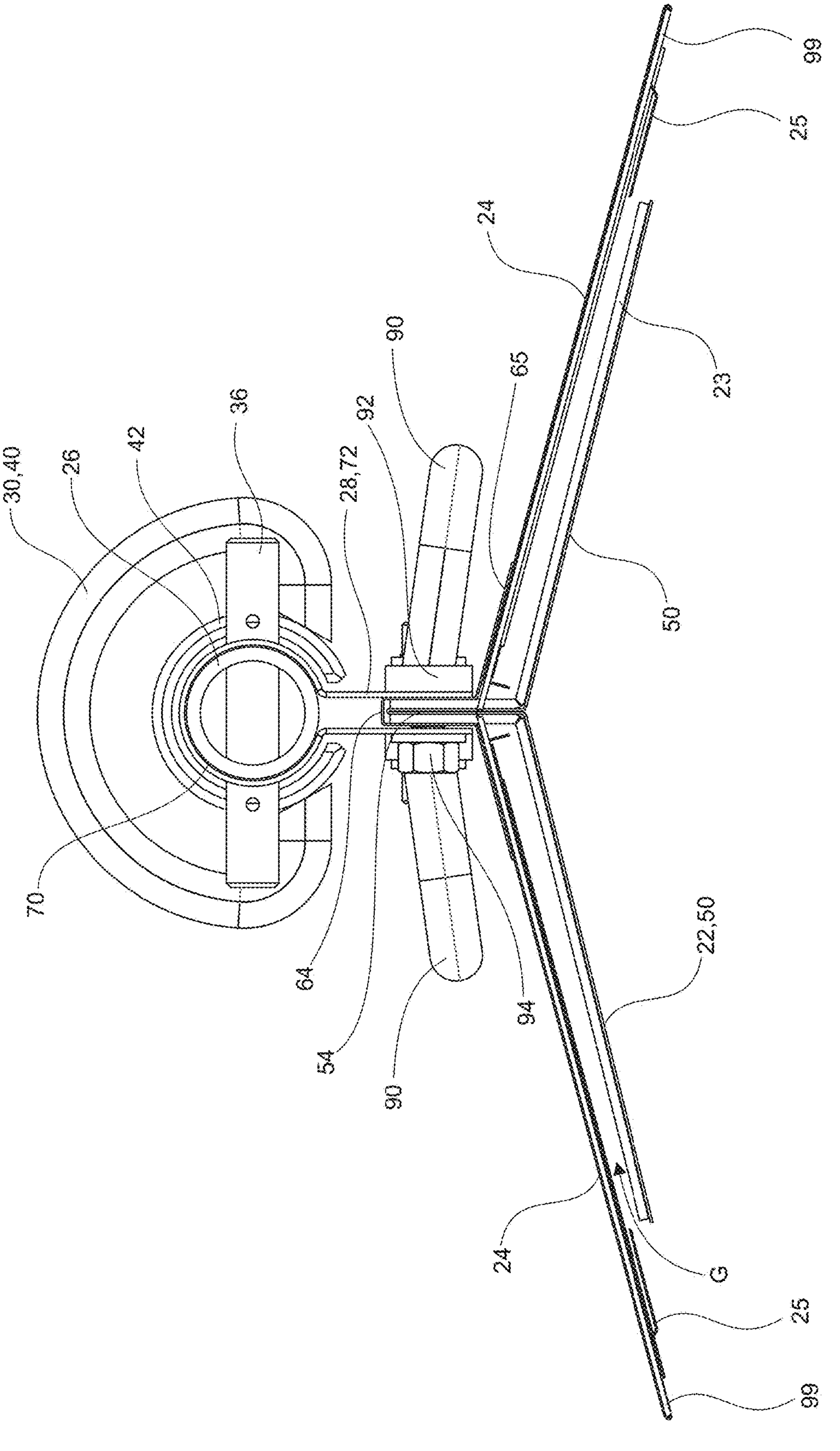
FIG. 4 is an end view of the module of FIG. 1.
Figure 13:
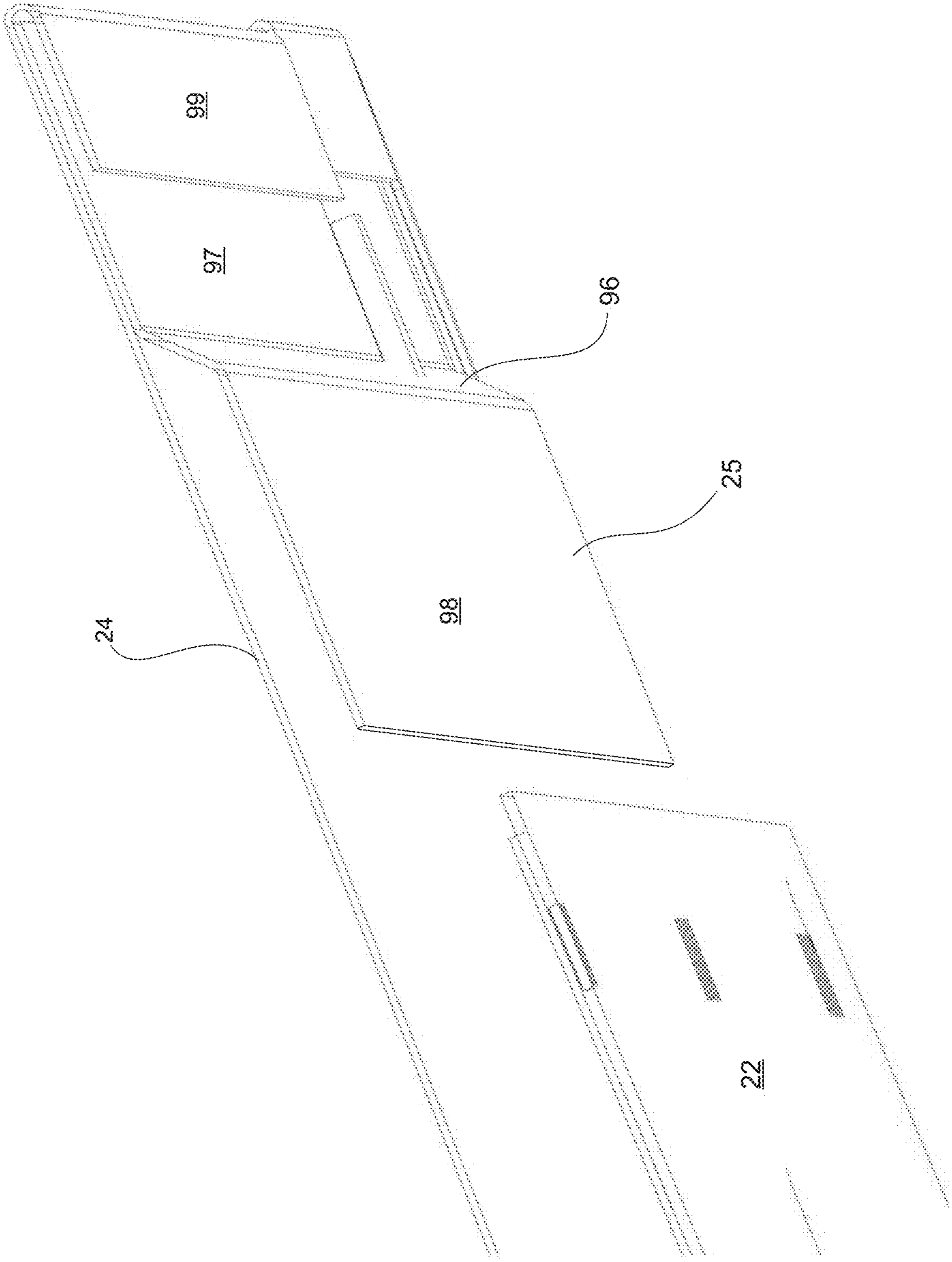
FIG. 13 is a zoomed-in bottom perspective view of the module of FIG. 1, showing a wind clip according to an embodiment.

In some embodiments, the module 20 further comprises one or more wind clips for securing the flashings 24 and flashing end sheets 29 to the structure. In one embodiment, as best shown in FIGS. 4 and 13, the wind clip 25 is a cleat having an axially extending mid portion 96 and an upper wing 97 and a lower wing 98 extending laterally at different heights from the lengthwise sides of the mid portion. The outer edges of the flashings 24 and flashing end sheets 29 may be folded under to provide an open hem 99 for receiving the upper wing 97 of the wind clip 25. The lower wing 98 may be secured to the structure by fasteners or other techniques known to those in the art. When the upper wing 97 is received in the open hem 99 of the flashings 24 (and optionally flashing end sheets 29) and the lower wing 98 is attached to the structure, the wind clip 25 helps the flashings 24 and flashing end sheets 29 resist any uplift as a result of wind, and helps prevents the majority of wind-blown moisture from reaching structural sheet 22.

Figure 12:
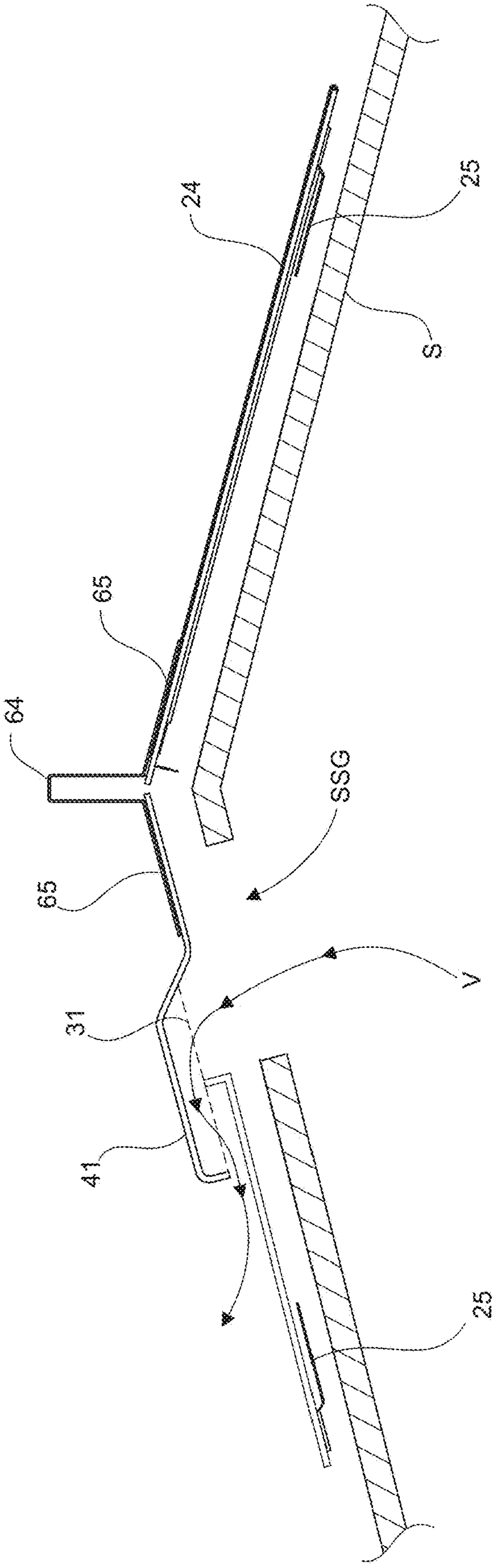
FIG. 12 is a cross-section view of a module of the fall protection system configured to provide ventilation, according to another embodiment.

The fall protection system may be configured to allow ventilation, i.e. to allow air from inside the building structure to exit therethrough. A sample embodiment is shown in FIG. 12. In order to ventilate air through an opening SSG in the sheathing S of a building structure, the fall protection system is configured such that the opening SSG is positioned either (i) in between the structural sheets of two adjacent modules; or (ii) to coincide with a hole in the attachment panel 50, a gap in the attachment panel 50, or a gap in the structural sheet 22 of a module in the fall protection system. In embodiments, the opening in the sheathing S is positioned somewhere between the trusses of the building structure. In whichever configuration, when the fall protection system is secured to the building structure, the opening SSG allows air to pass therethrough.

In the illustrated embodiment in FIG. 12, the opening SSG is positioned in between the structural sheets of two adjacent modules. In this embodiment, the fall protection system comprises a vent 41 adjacent to the opening SSG. The vent 41 has a perforated surface 31 through which air can flow. The vent 41 may be a box vent. In embodiments, the vent 41 is positioned at or near the opening SSG to allow air inside the building structure to exit via the opening SSG and the perforated surface 31 in the vent 41. The flow path for the air escaping the building structure is denoted by the letter "V". In most embodiments, vent 41 is configured to allow air to flow therethrough without exposing the structural sheet(s) 22 or the sheathing S to water and other elements. In the illustrated embodiment, the gap between flashing 24, ridge 64, and wind clip 25 is filled and sealed by the vent 41. In other words, the gap in flashing 24 is replaced by vent 41. The fall protection system may or may not include vent 41 on both sides of the ridge 64.

Assembly and Installation

The fall protection system may be assembled and installed, for example, as follows:

i) attaching the structural sheet 22 to the building structure by fasteners, such as screws, bolts and nuts, etc., through the apertures 34 at the attachment locations 33 in the attachment panel(s) 50;
ii) optionally, aligning one or more structural stiffeners 23 with the apertures of the ridge 54;
iii) placing the ridge 64 over ridge 54 such that ridge 54 is matingly received in the channel of ridge 64;
iv) aligning the apertures of the ridge 54 with the apertures of the ridge 64;
v) optionally, attaching the lower wing 98 of a wind clip 25 to the building structure, adjacent a lengthwise side of attachment panel 50;

vi) attaching a flashing 24 on one or both length sides of the ridge 64, which may be done prior to or after placing ridge 64 over ridge 54, and if the wind clip 25 is included, fitting the upper wing 97 of the wind clip into the open hem 99 of the flashing 24 prior to attaching the flashing to the flange 65 of ridge 64; and vii) one or both of:

a. feeding the rail 26 through the sleeve portion 70 of the plurality of rail clamps 28, such that the rail clamps 28 are intermittently spaced apart on the rail 26; placing the leg portion 72 of the plurality of rail clamps 28 on to the ridge 64 with the legs of the leg portion straddling the ridge 64; aligning the apertures in the leg portion 72 with the apertures in ridges 54,64; securing the rail clamps 28 to ridges 54,64 using fasteners, such as nuts and bolts, at the aligned apertures; sliding the sleeve of the one or more sliders 30 on to the rail 26 from one end of the rail; and inserting a stop rod at or near each end of the rail 26; and b. attaching one or more anchorage connectors 90 to ridge 54 (and ridge 64, if included) by aligning the one or more apertures of the base plate of anchorage connector 92 with one or more of the apertures in ridges 54,64 (and optionally the apertures in the rail clamp 28, if included) at a desired location of ridge 64 and attaching the base plate to the ridge 64 using fastener 94; and viii) optionally, further securing ridge 64 to ridge 54 using fasteners, such as nuts and bolts, at any remaining aligned apertures.

Some or all of the attachment locations 33 may be aligned with the trusses of the building structure so that the structural sheet 22 is attached to one or more trusses via the fasteners. For installation on a roof, the attachment locations 33 of the structural sheet 22 may be spaced to align with the principal and/or common rafters to allow the structural sheet 22 to be attached to same. The module 20 may be used on wood truss roofs, roofs of asphalt and/or metal construction, tile roofs, sloped roofs, flat roofs, etc. Further, module 20 may be fabricated to have the spacing of attachment locations 33 coincide with the underlying structure. In some embodiments, shingles may be installed on the roof after the module 20 is in place and the shingles or a flexible membrane may partially cover the structural sheet 22 or vice versa.

To fit different building structures, the length of the fall protection system may be configured and customized by: (i) selecting (or cutting) a module 20 of a desired length and width; (ii) connecting a plurality of modules 20 in series, as described above; and/or (iii) using a group of unconnected modules 20. Of course, other configurations may be possible. For installation on a roof, the fall protection system may be customized according to the roof pitch and the underlying structure (e.g. truss spacing or roof panel spacing of the roof). To fit a variety of structures, the fall protection system may be configured and/or customized to align with an intermediate fixture(s) to facilitate attachment to the aforementioned structure.

If the rail 26 has a free end, i.e. an end that is not connected to the rail of another module, a stop rod 36 may be included near the free end to prevent the slider(s) 30 from sliding off the rail 26 at the free end. This is especially important where the free end is near an edge of the building structure when the module 20 is installed and where parallel loading may occur.

The fall protection system, the module, or any part thereof may be preassembled or assembled on site prior to installation on a structure. Alternatively, the module may be assembled after the structural sheet 22 is installed on the building structure. Further, the fall protection system may be installed during the construction of the building structure or retrofitted on to an existing building structure. The fall protection system may be left on the building structure as a permanent fixture, thereby allowing future use without the need for reinstallation.

While the present disclosure only describes using fasteners to assemble the various components of the fall protection system and to attach the fall protection system to the building structure, one skilled in the art can appreciate that other attachment techniques may be used.

Safety Features

Once the fall protection system is installed on a building structure, a person attached to the anchorage connector 90, via a safety line of a suitable length, can use the anchorage connector 90 as a discrete fall protection tie-back or as a way to safely suspend from the building structure. When the person is suspended from the building structure via the anchorage connector, the force exerted by the person's weight at the anchorage connector is transmitted and spread throughout the structural sheet 22. Accordingly, the fall protection system is configured to safely support the person's weight or potential fall at the anchorage connector.

When the person is attached to the installed fall protection system at the slider anchorage connector 40 of the slider 30, via a safety line of a suitable length, the person can move about the building structure continuously to access most areas of same. In the event that the person falls, a force is exerted on the slider anchorage connector 40 and at least some of that force is transmitted to the structural sheet 22. The stress in structural sheet 22 due to the exerted force causes the structural sheet to deform, thereby absorbing at least some of the energy of the fall and thus reducing the risk of injury to the person. In some embodiments, the deformation of the structural sheet may be plastic and may resemble "wrinkles" especially where the stress is the most concentrated. The amount of deformation, thus the amount of energy absorbed by the structural sheet 22, depends on the location and angle of the force. The force on the slider anchorage connector 40 may also cause deflection of the rail 26, rail clamps 28, and/or ridges 54,64. Such deflection also helps absorb some of the energy of the fall. The deformation and deflection of the fall protection system may also help reduce uplift on the fasteners of the attachment panel opposite the fall by decreasing moment and increasing shear loading. The force applied to the rail 26 is transferred to at least one clamp 28, which in turn distributes the force to at least two rows of apertures 34, thereby reducing the point loads to the structure. In other words, the spacing of the rail clamps helps distribute the load to at least two attachment locations 33 of the structural sheet.

Where the fall protection system 20 comprises two or more modules connected in series, it may be possible to replace the deformed module(s) in isolation without uninstalling and reinstalling the remaining intact module(s).

Figure 14A:
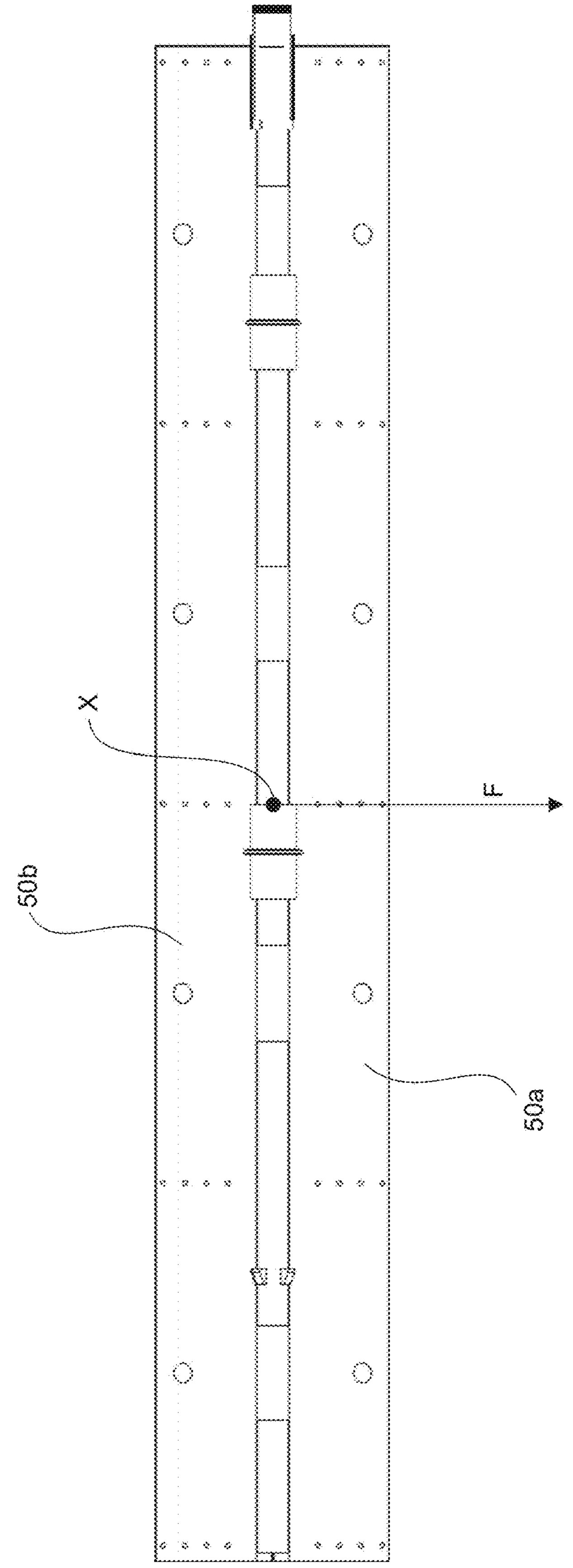
FIG. 14A is a schematic representation depicting a force exerted on a sample fall protection system in one experiment.
Figure 14B:
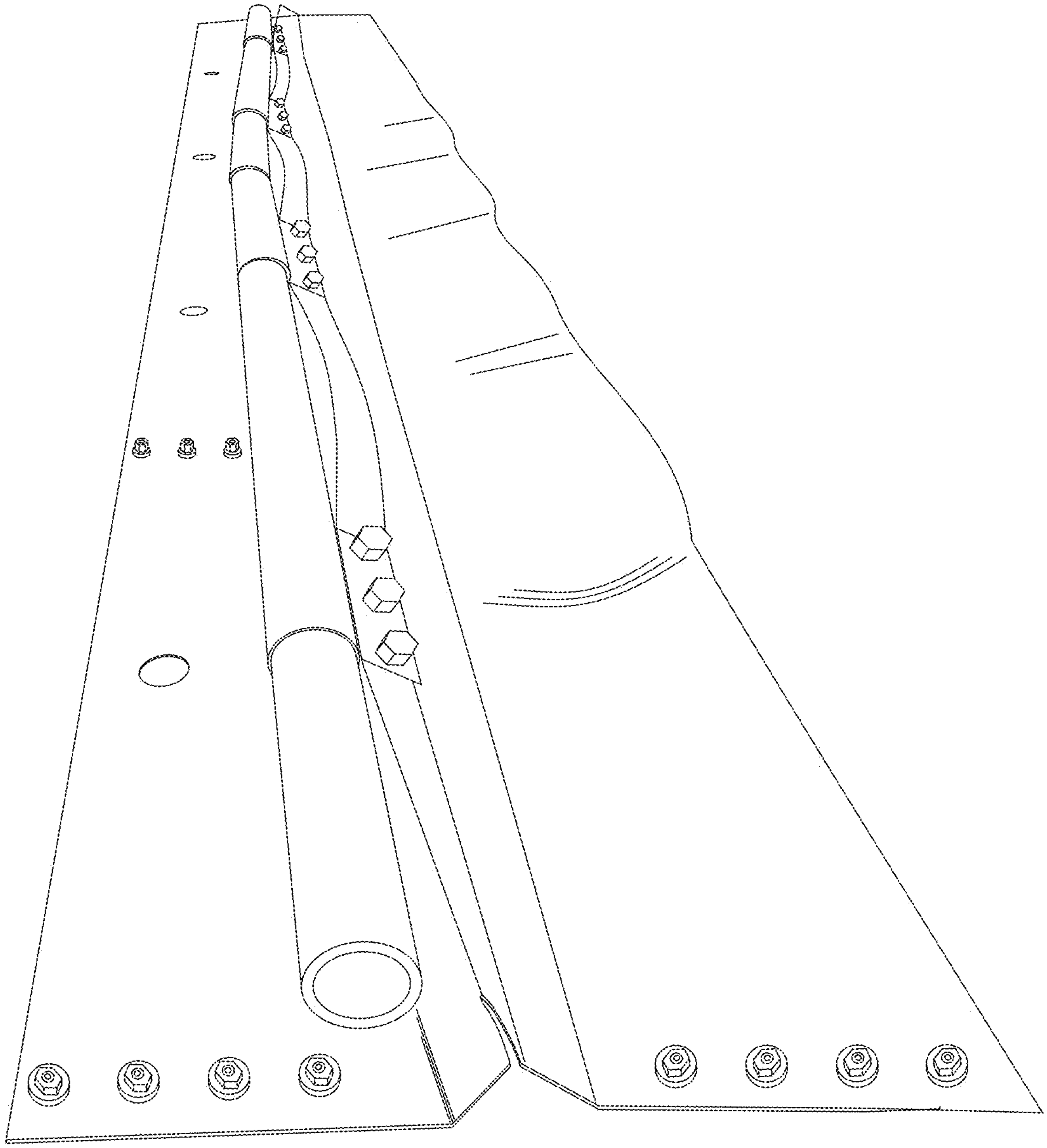
FIG. 14B is an illustration showing the resulting deformation of the fall protection system depicted in FIG. 14A.

With reference to FIG. 14A, an experiment was conducted on the fall protection system installed on a rigid structure. A force F of approximately 9500 lbs was exerted at a location X of the rail as shown in FIG. 14A. The resulting deformation of the fall protection system, especially the structural sheet, is shown in FIG. 14B.

In some embodiments, the structural sheet 22 and/or the flashings 24 are provided in one or more standard lengths so as to be able to create a longitudinally continuous fall protection system of any size.

The fall protection system can be installed on a variety of structures, including roofs with any pitch and may thereby ensure waterproofing. The fall protection system can be adapted to any type of roof system (e.g. asphalt shingles, metal tile, etc.) and allow multiple operators to work safely simultaneously.

The fall protection system also allows direct safety line attachment to the rail, which may not be possible in many other low profile rail systems.

The fall protection system protrudes to a minimal extent with respect to the ridge of the roof. The fall protection system may be particularly advantageous for roofs on which photovoltaic systems are to be installed, since the fall protection system may facilitate the installation of such systems, using all the surface of the roof, and casts minimal shadows on the panels by virtue of its reduced vertical profile, with its primary location at the peak of the roof.

The speed and simplicity of installation of the fall protection system may reduce the costs and inconvenience for the end user.

The fall protection system combines the ease of use of a cable or rail system with the advantages of a deformable anchor while also eliminating the excessive deflections caused by cable systems and enabling the load to be spread about the structure.

Contrary to conventional safety rail systems, the fall protection system provides a structural sheet and flashing system that becomes an integral part of a structure, substituting the shingles or other covering members at the ridge of the roof.

Accordingly, fall protection systems for use on a structure are described herein. In embodiments, the fall protection system comprises a module comprising: a structural sheet having a ridge with two lengthwise sides, one or both of the lengthwise sides having a respective attachment panel extending laterally therefrom, the attachment panel being attachable to the structure; and one or both of: (i) an anchorage connector attached to the ridge; and (ii) at least one rail clamp attached to the ridge; a rail supported by the at least one rail clamp; and a slider supported on the rail, the slider being slideably movable axially along the rail, and the slider having a slider anchorage connector.

In some embodiments, each of the at least one rail clamp has a leg portion, and the leg portion is attached to the ridge. In some embodiments, each of the at least one rail clamp has a sleeve portion, and the rail extends through and is supported by the sleeve portion.

In some embodiments, the module further comprises a flashing ridge having two lengthwise sides and wherein the flashing ridge is attached to the ridge.

In some embodiments, the ridge and the flashing ridge each have one or more attachment sections and the flashing ridge has an inner channel, wherein a portion of the ridge is received in the inner channel, wherein at least one of the one or more attachment sections of the flashing ridge is aligned with at least one of the one or more attachment sections of the ridge to provide at least one aligned attachment section, and wherein the flashing ridge is attached to the ridge at the at least one aligned attachment section.

In some embodiments, one or both of the lengthwise sides of the flashing ridge have a respective flashing extending laterally therefrom.

In some embodiments, the respective flashing corresponds to the respective attachment panel to provide coverage for at least a portion of the respective attachment panel.

In some embodiments, a gap is defined between the respective flashing and the corresponding respective attachment panel.

In some embodiments, the slider has a slider sleeve, the slider sleeve having an inner diameter that is greater than an outer diameter of the sleeve portion.

In some embodiments, the slider has a slider sleeve, the slider sleeve having a gap that is sized to fit the leg portion therethrough.

In some embodiments, the module comprises the rail and the at least one rail clamp and further comprises one or more stop rods, and wherein at least a portion of each of the one or more stop rods extends radially outwardly from an outer surface of the rail or one of the at least one rail clamp.

In some embodiments, both of the lengthwise sides have the respective attachment panel, wherein an angle is defined between the respective attachment panels, and wherein the angle ranges from about 0° to about 180°.

In some embodiments, the module further comprises a flashing end sheet at one or both ends of the respective flashing.

In some embodiments, the module further comprises one or more wind clips.

In some embodiments, one or both of the respective flashing and the flashing end sheet comprise an open hem at an outer edge and a portion of one of the one or more wind clips is received in the open hem.

In some embodiments, the fall protection system further comprises a vent.

In some embodiments, the module further comprises one or more stiffeners.

In some embodiments, the fall protection system further comprises a second module, the second module comprising: a second structural sheet having a second ridge having two lengthwise sides, one or both of the lengthwise sides having a respective second attachment panel extending laterally therefrom, the second attachment panel being attachable to the structure.

In some embodiments, the module and the second module are connected in series.

In some embodiments, the fall protection system further comprises a flashing ridge having two lengthwise sides, the flashing ridge being attached to one or both of the ridge and the second ridge, wherein one or both of the lengthwise sides of the flashing ridge have a respective flashing extending laterally therefrom, and wherein the respective flashing provides coverage for one or both of at least a portion of the respective attachment panel and at least a portion of the respective second attachment panel.

In some embodiments, the second module further comprises one or both of: (i) a second anchorage connector attached to the second ridge; and (ii) at least one second rail clamp attached to the second ridge; and a second rail supported by the at least one second rail clamp.

In some embodiments, the rail is one and the same as the second rail.

Methods for assembling a fall protection system are also described herein. According to some embodiments, the method comprises: attaching an attachment panel of a structural sheet to a structure, the structural sheet comprising a ridge having two lengthwise sides, the attachment panel extending laterally from one of the lengthwise sides; and one or both of: (i) attaching an anchorage connector to ridge; and (ii) feeding a rail through a plurality of rail clamps; attaching the plurality of rail clamps to the ridge; and placing a slider on the rail, the slider being slideably movably axially along the rail, the slider having a slider anchorage connector.

In some embodiments, the method further comprises, subsequent to attaching the attachment panel, securing a flashing ridge to the ridge, the flashing ridge having a first end and two lengthwise sides; and attaching a flashing to the flashing ridge at one of the lengthwise sides, the flashing extending laterally from the one of the lengthwise sides to provide coverage for at least a portion of the attachment panel.

In some embodiments, the method further comprises attaching a flashing end sheet at one or both ends of the flashing.

In some embodiments, the method further comprises, prior to attaching the flashing to the flashing ridge, attaching a first wing of a wind clip to the structure; and engaging a second wing of the wind clip with the flashing.

In some embodiments, the attachment panel is attached to one or more of a principal rafter of the structure, a common rafter of the structure, an underlying structure, an addition to the structure, and an intermediate fixture attached to the structure.

In some embodiments, the method further comprises connecting the first end of the flashing ridge to a second end of a second flashing ridge, wherein the second flashing ridge is secured to a ridge of a second structural sheet; and attaching an attachment panel of the second structural sheet to the structure.

In some embodiments, the method further comprises, subsequent to placing a slider on the rail, installing one or more stop rods on the rail.

In some embodiments, the method further comprises attaching a safety line directly to the rail.

Kits for a fall protection system are also described herein. According to some embodiments, the kit comprises: a structural sheet having a ridge with two lengthwise sides, one or both of the lengthwise sides having a respective attachment panel extending laterally therefrom, and one or both of: (i) an anchorage connector for attachment to the ridge; and (ii) at least two rail clamps for attachment to the ridge; a rail supportable by the at least two rail clamps; and a slider supportable on the rail and slideably movable axially along the rail, and the slider having a slider anchorage connector.

In some embodiments, each of the at least two rail clamps has a respective sleeve portion and a respective leg portion, the respective leg portion for attachment to the ridge and the respective sleeve portion for receiving a portion of the rail.

In some embodiments, the kit further comprises one or more stop rods.

In some embodiments, the kit further comprises a flashing ridge for attachment to the ridge; and at least one flashing attachable to a lengthwise side of the flashing ridge.

In some embodiments, the kit further comprises one or more flashing end sheets.

In some embodiments, the kit further comprises one or more wind clips.

In some embodiments, the kit further comprises a vent.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed is:

1. A fall protection system for use on a structure comprising:

a module comprising: a structural sheet having a ridge with two parallel lengthwise sides, one or both of the lengthwise sides having a respective attachment panel extending laterally therefrom, the respective attachment panel being attachable to the structure, wherein the ridge is substantially perpendicular to an angle between the lengthwise sides and the respective attachment panel; a flashing ridge having two parallel lengthwise sides and an inner channel therebetween, wherein the ridge is received into the inner channel such that the flashing ridge is parallel to and covers the ridge; wherein the lengthwise sides of the ridge and the lengthwise sides of the flashing ridge each comprise one or more respective apertures, wherein the one or more respective apertures are aligned with one another to receive one or more fasteners therethrough to attach one or both of, a rail clamp and one or more anchorage connectors to both the ridge and the flashing ridge simultaneously.

2. The fall protection system of claim 1, wherein the ridge is configured to attach to the rail clamp, and wherein the module further comprises:

at least one rail clamp attached to the ridge and the flashing ridge; and a rail supported by the at least one rail clamp.

3. The fall protection system of claim 2, wherein each of the at least one rail clamp has at least one of:

a leg portion, and the leg portion is attached to the ridge and the flashing ridge; and a sleeve portion, and the rail extends through and is supported by the sleeve portion.

4. The fall protection system of claim 1, wherein the ridge and the flashing ridge each have one or more attachment sections, wherein at least one of the one or more attachment sections of the flashing ridge is aligned with at least one of the one or more attachment sections of the ridge to provide at least one aligned attachment section, and wherein the flashing ridge is attached to the ridge at the at least one aligned attachment section.

5. The fall protection system of claim 4, wherein one or both of the lengthwise sides of the flashing ridge have a respective flashing extending laterally therefrom.

6. The fall protection system of claim 5, wherein the respective flashing corresponds to the respective attachment panel to provide coverage for at least a portion of the respective attachment panel.

7. The fall protection system of claim 6, wherein a gap is defined between the respective flashing and the corresponding respective attachment panel.

8. The fall protection system of claim 2, wherein the module further comprises one or more stop rods, and wherein at least a portion of each of the one or more stop rods extends radially outwardly from an outer surface of the rail or one of the at least one rail clamp.

9. The fall protection system of claim 1, wherein both of the lengthwise sides of the ridge have the respective attachment panel, wherein an angle is defined between the respective attachment panels, and wherein the angle ranges from about 02 to about 180°.

10. The fall protection system of claim 5, wherein the module further comprises a flashing end sheet at one or both ends of the respective flashing.

11. The fall protection system of claim 5, wherein the module further comprises one or more wind clips.

12. The fall protection system of claim 1, further comprising a vent.

13. The fall protection system of claim 1, wherein the module further comprises one or more stiffeners.

14. The fall protection system of claim 1, further comprising a second module, the second module comprising: a second structural sheet having a second ridge having two lengthwise sides, one or both of the lengthwise sides having a respective second attachment panel extending laterally therefrom, the second attachment panel being attachable to the structure.

15. The fall protection system of claim 14, wherein the module and the second module are connected in series.

16. The fall protection system of claim 14, wherein one or both of the lengthwise sides of the flashing ridge have a respective flashing extending laterally therefrom, and wherein the respective flashing provides coverage for one or both of at least a portion of the respective attachment panel and at least a portion of the respective second attachment panel.

17. The fall protection system of claim 14, wherein the second ridge is configured to attach to one or both of: a second rail clamp; and one or more second anchorage connectors.

18. A kit for a fall protection system, the kit comprising:

a structural sheet having a ridge with two parallel lengthwise sides, one or both of the lengthwise sides have a respective attachment panel extending laterally therefrom, wherein the ridge is substantially perpendicular to an angle between the lengthwise sides and the respective attachment panel;

a flashing ridge having two parallel lengthwise sides and an inner channel therebetween, wherein the ridge is received into the inner channel such that the flashing ridge is parallel to and covers the ridge; and one or both of:

(i) an anchorage connector for attachment to the ridge and the flashing ridge; and (ii) at least two rail clamps for attachment to the ridge and the flashing ridge; and a rail supportable by the at least two rail clamps;

wherein the lengthwise sides of the ridge and the lengthwise sides of the flashing ridge each comprise one or more respective apertures, wherein the one or more respective apertures are aligned with one another to receive one or more fasteners therethrough to attach one or both of the anchorage connector and the at least two rail clamps to the ridge and the flashing ridge simultaneously.

19. The kit of claim 18, wherein each of the at least two rail clamps has a respective sleeve portion and a respective leg portion, the respective leg portion for attachment to the ridge and the flashing ridge and the respective sleeve portion for receiving a portion of the rail.

20. The kit of claim 18, further comprising one or more stop rods.

21. The kit of claim 18, further comprising one or more flashing end sheets.

22. The kit of claim 18, further comprising one or more wind clips.

23. The kit of claim 18, further comprising a vent.

24. The fall protection system of claim 2, further comprising a slider supported on the rail, the slider being slideably movable along the rail, and the slider having a slider anchorage connector.

25. The fall protection system of claim 24, wherein the at least one rail clamp has a sleeve portion and the rail extends through and is supported by the sleeve portion; and wherein the slider has a slider sleeve, the slider sleeve having an inner diameter that is greater than an outer diameter of the sleeve portion.

26. The fall protection system of claim 24, wherein the at least one rail clamp has a leg portion and the leg portion is attached to the ridge and the flashing ridge; and wherein the slider has a slider sleeve, the slider sleeve having a gap that is sized to fit the leg portion therethrough.

27. The kit of claim 18, wherein the kit comprises the at least two rail clamps and the rail and further comprising a slider supportable on the rail and slideably movable axially along the rail, and the slider having a slider anchorage connector.

* * * * *